United States Patent [19]

Tsutsumi

[11] Patent Number: 4,639,739
[45] Date of Patent: Jan. 27, 1987

[54] THERMAL TRANSFER RECORDING METHOD AND APPARATUS

[75] Inventor: Teruo Tsutsumi, Tama, Japan
[73] Assignee: Kabushiki Kaisha Toshiba, Japan
[21] Appl. No.: 775,264
[22] Filed: Sep. 12, 1985
[30] Foreign Application Priority Data Nov. 30, 1984 [JP] Japan ................................ 59-254331

[51] Int. Cl.$^4$ ............................................. G01D 15/10
[52] U.S. Cl. .................................. 346/76 PH; 346/134; 346/105; 400/593; 400/120
[58] Field of Search ................ 346/76 PH, 134, 135.1, 346/105; 358/304; 355/13; 400/593, 120; 219/216 PH

[56] References Cited
U.S. PATENT DOCUMENTS 4,505,603  3/1985  Yana ................................ 346/76 PH
4,560,990  12/1985  Sue et al. ......................... 346/76 PH Primary Examiner—Arthur G. Evans
Attorney, Agent, or Firm—Finnegan, Henderson, Farabow, Garrett & Dunner

[57] ABSTRACT

In a thermal transfer recording method for use in a recording apparatus using a roll of recording paper of an ordinary paper material wound about a core and an ink ribbon wound about an ink ribbon feeding roll, the recording paper and the ink ribbon are transported forwardly while they are superimposed one above the other and the recording is effected by means of a thermal head during their transportation. While the recording paper and the ink ribbon are released from the clamped state by means of the platen roller and the thermal head, only the recording paper is transported to a cutter where a recorded part of the recording paper is cut off. An unused part of the recording paper is then transported to until its leading end reaches the thermal head, where the recording paper and the ink ribbon are superimposed one above the other again.

17 Claims, 5 Drawing Figures

THERMAL TRANSFER RECORDING METHOD AND APPARATUS

BACKGROUND OF THE INVENTION

1. Field of the Invention

The present invention relates to a thermal transfer recording method. Further, the present invention relates to an apparatus for carrying out the aforesaid method.

2. Description of the Prior Art

In the hitherto known facsimile apparatus, as means for receiving image information of an original and recording it, the electrostatic recording method and thermal transfer recording method are mainly employed for the signal receiving and recording mechanism. The electrostatic recording method has an advantageous feature that recording can be effected at a high speed with high image resolvability, but it has drawbacks that the apparatus using this method is complicated and expensive because developing and fixing of images are required. In addition, recording paper used in this apparatus is expensive, resulting in comparatively increased running cost. On the other hand, the thermal transfer recording method has advantageous features that developing and fixing of images are not required because the image is built by primary coloring under the effect of heating and an apparatus using this method can be constructed in a comparatively simple manner, but it has drawbacks that recording papers are of specially produced type which have less durability and the images recorded thereon can be falsified relatively easily.

In view of the problems inherent to the recording methods as described above, it has been proposed that thermal transfer recording apparatus be used for facsimile equipment in which inexpensive ordinary paper is employed as recording medium. The thermal transfer recording apparatus of this type is operated such that recording paper, made of ordinary paper; and ink ribbon, serving as master recording material and comprising a base film made of paper, plastic or like material with a layer of thermally fusible solid ink containing coloring agent coated thereon; are superimposed one above another so that the ink layer comes in contact with the recording paper and they are transported in a certain direction while the base film is depressed by means of a platen roller so as to allow it to come in contact with heating resistor elements of a thermal head. When pulse electric current is selectively caused to flow through the heating resistor elements in response to signals representing an image to be recorded, heat is generated at the heating resistor elements. The generated heat is transmitted to the solid ink layer through the base film of the ink ribbon. Thus, the solid ink layer becomes viscous and is in a semi-fused state. The semi-fused ink is transferred to recording paper under the influence of pressure provided by the platen roller whereby a permanent image is transferred to the paper.

Since this type of recording apparatus uses ordinary paper as the recording medium and does not require processes of developing and fixing, running cost can be reduced considerably and the apparatus can be manufactured in a simple construction, in smaller dimensions and at an inexpensive cost. Further, since coloring agent having excellent weather resistance is used for the ink which is transferred only onto a required area on the paper, the recording paper and the recorded images are durable for a longer time and falsification of the recorded image is difficult compared with the foregoing heat sensitive recording apparatus.

However, it has been pointed out that the existent thermal transfer recording apparatuses fail to satisfactorily meet a variety of requirements for receiving and recording image signals when used in a facsimile apparatus.

For instance, when the thermal transfer recording apparatus of the above type is applied to a facsimile apparatus, recording paper having the size of A4 (29.7 cm×21 cm) or B4 (36.4 cm×25.7 cm) is used as recording medium and therefore the length of an original of which image signals can be completely sent and received is limited by the length of the sheets of recording paper. Further, in the conventional thermal transfer recording apparatus, the ink ribbon and the recording paper correspond to each other in the one-to-one relation and the length of ink ribbon is determined to have the length of the recording paper. Therefore, both the ink ribbon and the recording paper tend to have a blank area which is not concerned with recording operation. This is not preferable from the view point of cost and process efficiency. Further, since the paper storage section for storing a pile of paper sheets require a considerably large space, the thermal transfer recording apparatus using ordinary paper is more difficult to use in a small facsimile apparatus designed to be placed on a desk than in the case of the hitherto known heat sensitive recording apparatus.

Furthermore, the conventional thermal transfer recording system uses an ink ribbon made of very thin film having a thickness of about 10 micrometers and, therefore, very careful handling is required during the whole operation of the facsimile apparatus. In view of the fact that the ink ribbon and the recording paper are transported while they are superposed one above the other, there is a fear of causing deterioration of the recorded image. In the extreme case it becomes impossible to effect recording due to a number of wrinkle lines over the whole length of ink ribbon which tend to be developed during production of ink ribbon or when the facsimile apparatus is operated incorrectly.

SUMMARY OF THE INVENTION

Hence, the present invention has been made with the foregoing background in mind and its object resides in providing an improved thermal transfer recording method which makes it possible to effect recording on a recording paper having any required length.

Another object of the present invention is to provide an apparatus for carrying out the aforesaid method effectively.

Still another object of the present invention is to provide an improved thermal transfer recording method and apparatus which assure that the apparatus is designed and constructed in smaller dimensions.

A further object of the present invention is to provide an improved thermal transfer recording method and apparatus which avoids the useless consumption of the recording paper and the ink ribbon.

A still further object of the present invention is to provide improved thermal transfer recording method and apparatus in which wrinkle lines are prevented from appearing over the whole length of ink ribbon to assure that stable recording is achieved.

To accomplish the above objects there is proposed according to one aspect of the invention a thermal transfer recording method for use in a thermal transfer recording apparatus having a thermal head, a roll of recording paper of ordinary paper material wound about a core, an ink ribbon wound about an ink ribbon feeding roll and cutting means for cutting off a part of said roll of recording paper, this method comprising the steps of unwinding the roll of recording paper and the ink ribbon to bring them into pressure contact with the thermal head while superposing them one over the other; selectively transferring ink on the ink ribbon onto said recording paper by means of the thermal head; separating the recording paper away from the ink ribbon, and transporting the recording paper until the last ink transferred part of the recording paper reaches the cutting means while the ink ribbon remains unmoved; cutting the recording paper by the cutting means so that the ink transferred part of the recording paper is cut off; and transporting the recording paper until the leading end thereof is located in the proximity of the thermal head while the recording paper and the ink ribbon are superposed one over the other.

Further, to carry out the aforesaid method there is proposed according to another aspect of the invention a thermal transfer recording apparatus comprising frame means; a recording paper holder for rotatably holding a roll of recording paper of an ordinary paper material wound about a core; ink ribbon holding means including an ink ribbon feeding roll about which the ink ribbon is wound and an ink ribbon taking-up roll; a thermal head for transferring a layer of solid ink on the ink ribbon onto the recording paper unwound from the recording paper roll while ink is molten or in semi fused state; a platen roller adapted to come in contact with the thermal head with the recording paper and the ink ribbon being interposed therebetween in the superimposed state; means for releasing the thermal head and the platen roller from the pressure contacted state; and a cutter for cutting off the recorded part of the recording paper after completion of recording operation.

Other objects, features and advantages of the present invention will become more clearly apparent from reading the following description which has been prepared in conjunction with the accompanying drawings.

BRIEF DESCRIPTION OF THE DRAWINGS

The accompanying drawings will be briefly described below.

DESCRIPTION OF THE PREFERRED EMBODIMENT

Now, the present invention will be described in a greater detail with reference to the accompanying drawings.

Figure 1:
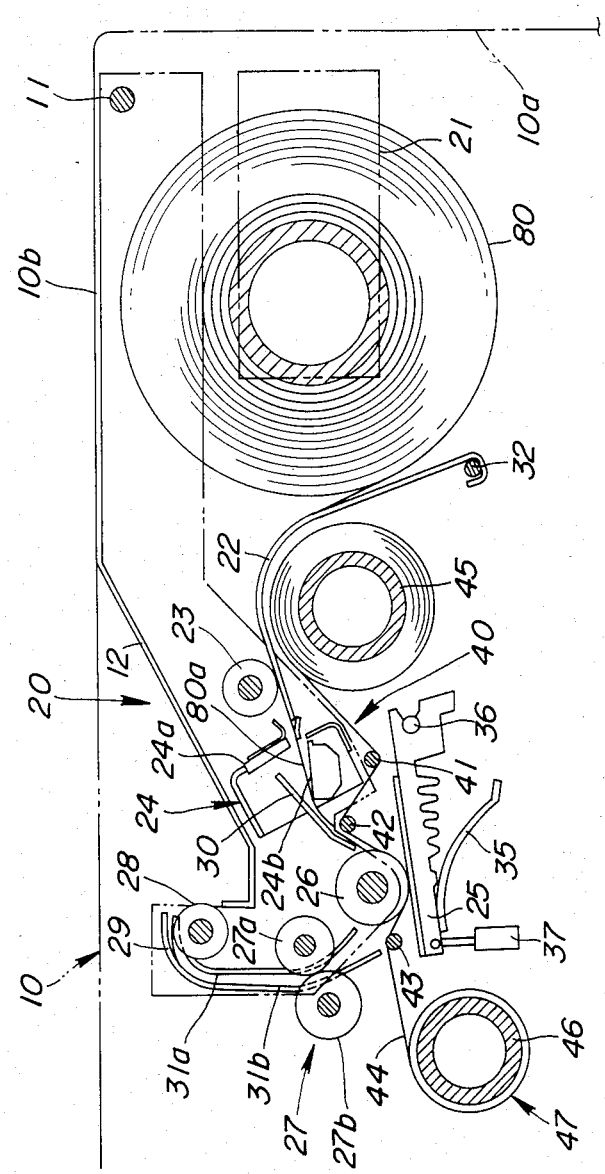
FIG. 1 is a fragmental schematic vertical sectional view of a facsimile machine including a facsimile signal receiving apparatus to which the thermal transfer recording method of the invention is applied.

Referring first to FIG. 1, the facsimile signal receiving apparatus is constituted by a casing frame 10a of which upper part has an opening and a cover frame 10b adapted to close the opening of the casing frame 10a. The cover frame 10b is turnably supported on the casing frame 10a by means of a support shaft 11 about which it is caused to turn. The whole facsimile signal receiving apparatus is fully covered with an apparatus casing 10 made of metallic plate material of which configuration is designed to well fit the contour of the apparatus.

The facsimile signal receiving apparatus includes a recording paper transportation passage 20. Specifically, the recording paper transportation passage 20 is constituted by a recording paper holder 21, a recording paper guide plate 22, a transportation roller 23, an automatic cutter 24, a thermal head 25, a platen roller 26, transportation rollers 27 comprising a driving roller 27a and a pinch roller 27b, a transportation roller 28, a leaf spring 29 adapted to come in contact with the transportation roller 28 under the effect of resilient force thereof, and guide plates 30, 31a and 31b disposed between the associated components. The recording paper holder 21, the transportation roller 23, the automatic cutter 24 and the thermal head 25 are arranged in the substantially horizontal direction in accordance with the illustrated order, whereas the transportation rollers 27 and 28 are arranged in the substantially vertical direction. Among the above-described components the transportation roller 23, the automatic cutter 24, the guide plate 30, the platen roller 26, the driving roller 27a constituting the transportation rollers 27, the transportation roller 28, the guide plates 31a and 31b and rotational power source as well as power transmission mechanism for each of the transportation roller 23, the platen roller 26, the driving roller 27a and the transportation roller 28 are mounted on the cover frame 10b in FIG. 1. The aforesaid rotational power sources and power transmission mechanisms are not shown in the drawing for the purpose of simplification of illustration.

As is apparent from the drawing, the recording paper guide plate 22 is made of metallic sheet plate having the arch-shaped configuration and its upper part where it comes in contact with the transportation roller 23 is fitted with a leaf spring. Further, its lower end part is fixedly secured to a shaft 32 which is rotatably supported on the casing frame 10a whereby it is caused to turn about the shaft 32 in response to turning movement of the cover frame which is initiated by actuating a lever mechanism which is not shown in the drawing. Thus, an ink ribbon feeding roll to be described later is easy to be loaded or replaced with a new one.

Figure 2:
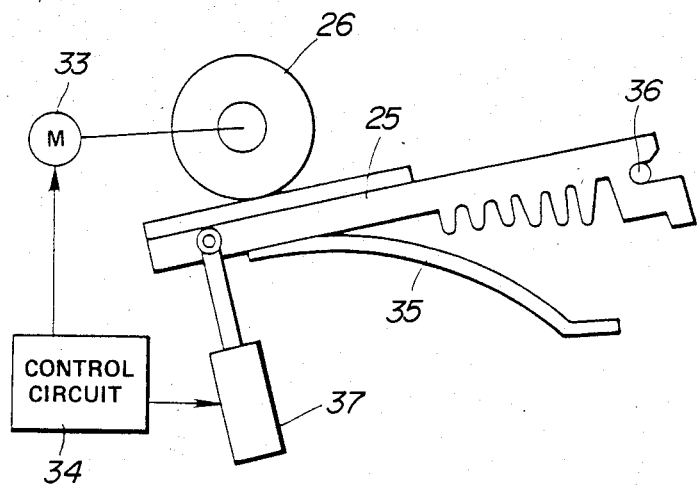
FIG. 2 is a schematic front view of pressure contact releasing means in the facsimile signal receiving apparatus in FIG. 1 for parting the thermal head away from the platen roller, shown in an enlarged scale.

The transportation roller 23 is adapted to clamp recording paper between the transportation roller 23 and the leaf spring attached to the upper end part of the recording paper guide plate 22 under the effect of a properly determined intensity of resilient force given by the leaf spring. As rotational power source, for instance, a stepping motor 33 adapted to rotate the platen roller as illustrated in FIG. 2 is actuated, the transportation roller 23 is rotated by means of the stepping motor 33 in synchronization with the platen roller 26 whereby recording paper is transported forwardly.

Next, the automatic cutter 24 is constructed by a combination of stationary blade 24a and movable blade 24b which is operatively connected to rotational power source such as motor, rotary solenoid or the like which is not shown in the drawing). Thus, when the rotational power source is actuated, recording paper is cut off.

The platen roller 26 is made of rubber with a shaft made of metallic material extended along the axis thereof, and it is located above a group of heating resistors on the thermal head 25. Further, it is rotated with the aid of rotational power source, power transmission means and speed reduction mechanism, for instance, stepping motor 33 operatively connected to the transportation roller 23 by gears or timing belts which are not shown in the drawing so that recording paper and ink ribbon are transported at a predetermined recording speed in response to pulses outputted from the control circuit while they are superimposed one above another.

The thermal head 25 is designed in the type of a line scanning thermal head and has a lot of micro heating resistors arranged in line at a predetermined density (for instance, 8 pieces/mm) by the number (for instance, 2048 pieces in total) corresponding to recording width (for instance, 256 mm in the case of B4 size). When the micro heating resistors are turned on in response to information concerning an image to be recorded, an area on the ink ribbon where the micro heating resistors come in contact with the latter is locally heated up and thereby the layer of solid ink is melted. As a result, a visual image is built on recording paper. It should be noted that the thermal head 25 is fitted with pressing means, such as leaf spring 35, which serves to turn the thermal head 25 about a pin 36 in the clockwise direction (in the upward direction) as seen in FIG. 2 so as to allow it to come in pressure contact with the platen roller 26 while ink ribbon and recording paper are interposed therebetween. Further, the thermal head 25 is operatively associated with pressure contact releasing means, for instance, electromagnetic actuator 37, which serves to turn the thermal head 25 in the counterclockwise direction (in the downward direction) as seen in the drawing until a certain gap is created between the thermal head 25 and the platen roller 26.

The guide plates 31a and 31b, the transportation rollers 27 and 28, and the leaf spring 29 adapted to come in contract with the transportation roller 28, each of which is disposed behind the platen roller 26, serve to transport further the recording paper on which recording has been effected to build an image by rotating the transportation rollers 27 and 28 by means of rotational power source, for instance, stepping motor which is not shown in the drawing,. Incidentally, in the drawing reference numeral 12 designates a recorded paper storage tray on which recording paper discharged from the apparatus are temporarily stored in the layered structure.

As illustrated in FIG. 1, the facsimile apparatus includes an ink ribbon transportation passage 40. Specifically, the ink ribbon transportation passage 40 is constituted by a plurality of guide bars 41, 42 and 43 which are extended across the apparatus casing 10. Thus, an ink ribbon 44 is transported by way of the guide bars 41 and 42, the space is defined between both the thermal head 25 and the platen roller 26 and the guide bar 43.

Figure 3:
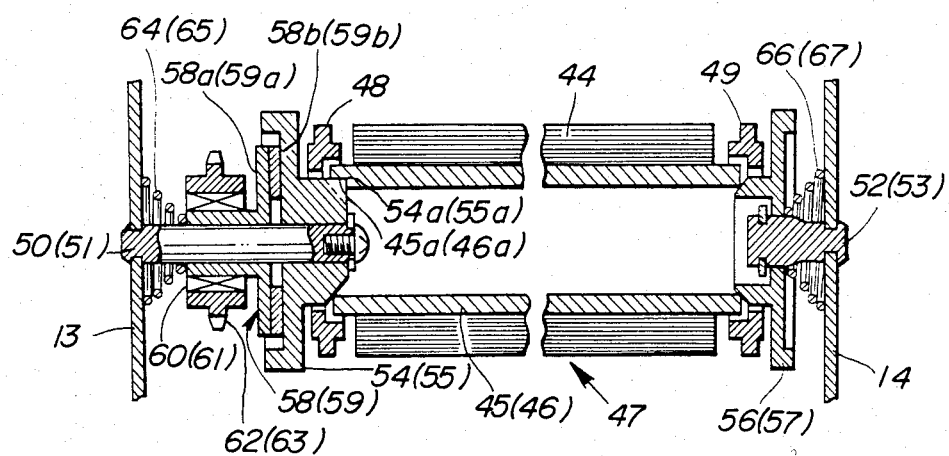
FIG. 3 is a vertical sectional view of ink ribbon holding means in the facsimile signal receiving apparatus, particularly illustrating how the means is constructed.

The ink ribbon 44 serves as master material for carrying out thermal transfer recording and it is constructed by a base film made of, for instance, polyethylene terephthalate and having a vert thin thickness, for instance, 6 microns, with a layer of solid ink coated thereon which is molten by quick heating of the thermal head. As is apparent from the drawing, a part of the ink ribbon is wound about an ink ribbon feeding roll 45 and another part of the same is wound about an ink ribbon take-up roll 46. They are housed in a cassette 47 and the ink ribbon feeding roll 45 and the ink ribbon winding roll 46 are rotatably supported on both the side plates 48 and 49 of the cassette 47, as illustrated in FIG. 3. The side plates 48 and 49 are and connected to one another via stays or like means. As illustrated in FIG. 1, the cassette 47 is loaded in the area located downwardly of the recording paper transportation passage 20.

Next, FIG. 3 illustrates by way of a sectional view how the cassette 47 is supported on the frames 13 and 14 in the casing 10. The frames 13 and 14 have shafts 50, 51, 52 and 53 fixedly secured thereto on which reels 54, 55, 56 and 57 are rotatably mounted. Among the reels the reels 54 and 55 have more than one projection 54a and 55a at their inner end. The projections 54a and 55a are adapted to come in engagement with grooves 45a and 46a on the one end face of the ink ribbon feeding roll 45 and the ink ribbon winding roll 46 whereby the ink ribbon feeding roll 45 and the ink ribbon take-up roll 46 are operatively connected to the reels 54 and 55. Further, joint members 58 and 59 are rotatably mounted on the shafts 50 and 51 extending between the reels 54 and 55 and the frame 13. The joint members 58 and 59 include circular discs 58a and 59a at their righthand end as seen in the drawing, and friction plates 58b and 59b are adhesively attached to the circular discs 58a and 59a. Further, one-way clutches 60 and 61 are mounted on the joint members 58 and 59 and moreover sprockets 62 and 63 are mounted on the latter with the one-way clutches 60 and 61 interposed therebetween. As will be apparent from FIG. 3, the joint members 58 and 59 are normally biased in the rightward direction as seen in the drawing under the effect of resilient force of compression springs 64 and 65 disposed between the joint members 58 and 59 and the frame 13 whereby the reels 54 and 55 are brought in pressure contact with the ink ribbon feeding roll 45 and the ink ribbon take-up roll 46 via the friction plates 58b and 59b. On the other hand, the reels 56 and 57 are normally biased in the leftward direction as seen in the drawing under the effect of resilient force of compression springs 66 and 67 disposed between the reels 56 and 57 and the frame 14 whereby the end face of each of the reels 56 and 57 is brought in pressure contact with the end face of each of the ink ribbon feeding roll 45 and the ink ribbon take-up roll 46.

Removal of the ink ribbon cassette 47 from the frames 13 and 14 of the casing 10 is achieved by way of the steps of displacing the ink ribbon cassette 47 in the rightward direction as seen in FIG. 3, pressing the reels 56 and 57 against the resilient force of the compression springs and disengaging the ink ribbon feeding roll 45 and the ink ribbon take-up roll 46 from the reels 54 and 55.

On the contrary, fitting of the ink ribbon cassette 47 to the frames 13 and 14 of the casing 10 is achieved by way of the steps of pushing the reels 56 and 57 with the ink ribbon cassette itself against the resilient force of the coil springs, engaging the end parts of the ink ribbon feeding roll 45 and the ink ribbon take-up roll to the reels 56 and 57 and engaging the other end parts of the ink ribbon feeding roll 45 and the ink ribbon take-up roll 46 to the reels 54 and 55.

Figure 4:
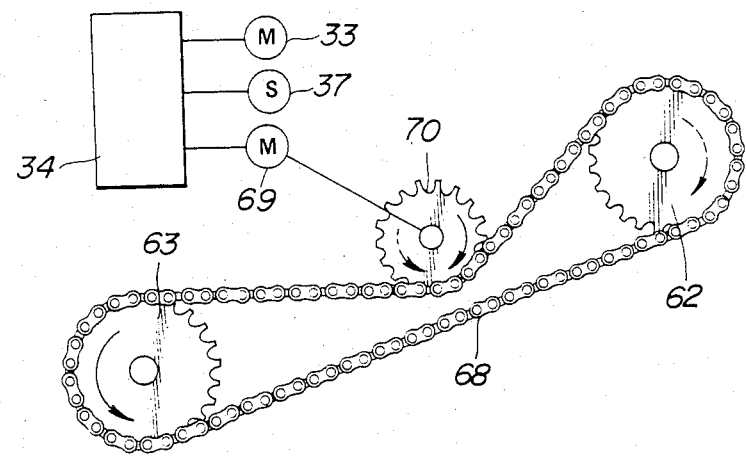
FIG. 4 is a front view of a driving mechanism in the facsimile signal receiving apparatus for transporting ink ribbon by using an endless chain.

In order to assure that the ink ribbon and the recording paper are transported in complete synchronization during the whole process of recording, the ink ribbon feeding roll 45 and the ink ribbon take-up roll 46 are typically driven by means of a driving mechanism as illustrated in FIG. 4. In the drawing, reference numeral 68 designates an endless roller chain comprising a number of links, busings and pins. As is apparent from the drawing, the roller chain 68 is endlessly extended around a sprocket 62 of the ink ribbon feeding roll 45 and a sprocket 63 of the ink ribbon take-up roll 46. Thus, the sprockets 62 and 63 are rotated by way of the roller chain 68 by another sprocket 70 which is fixedly connected to rotational power source, for instance, stepping motor 69, which is operated under control of a control circuit 34.

Specifically, as illustrated in FIG. 4, when the sprocket 70 is rotated in the direction as identified by an arrow mark scribed with real lines as the stepping motor 69 is rotated, the sprocket 63 in the area of the ink ribbon take-up roll 46 is rotated in the direction as identified by an arrow mark scribed with real lines. As the sprocket 63 is rotated in such a direction as described above, the one-way clutch 61 is brought in the locked state and thereby rotational power of the sprocket 63 is transmitted to the reel 55 via the joint member 59 so that the ink ribbon take-up roll 46 is rotated in the same direction as that of the sprocket 63. At this moment the sprocket 62 in the area of the ink ribbon feeding roll 45 is rotated in the direction reverse to that as identified by an arrow mark scribed with dotted lines. As the sprocket 62 is rotated in the direction as described above, the one-way clutch 60 is brought in the freely rotatable state and therefore the rotational power of the sprocket 62 is not transmitted to the joint member 58. Accordingly, in this case, rotational power outputted from the stepping motor 69 is transmitted only to the ink ribbon winding roll 46 and thereby only the ink ribbon take-up roll 46 is rotated. At this moment the ink ribbon feeding roll 45 is caused to rotate as a follower roll by way of the ink ribbon 44. It should be noted that since the ink ribbon feeding roll 45 is affected by frictional force which is caused by the friction plate 58b of the joint member 58 via the reel 54, the ink ribbon 44 is stretched under a properly determined intensity of tension.

On the other hand, as the sprocket 70 is rotated in the direction as identified by an arrow mark scribed with dotted lines by rotating the stepping motor 69 (in the reverse direction) in FIG. 4, the sprocket 62 in the area of the ink ribbon feeding roll 45 is rotated in the direction as identified by an arrow mark scribed with dotted lines. Once the sprocket 62 has been rotated in such a direction as described above, the one-way clutch 60 is kept in the locked state. Rotational power of the sprocket 62 is transmitted to the reel 54 via the joint member 58 whereby the ink ribbon feeding roll 45 is rotated in the same direction as that of the sprocket 62. At this moment the sprocket 63 in the area of the ink ribbon take-up roll 46 is rotated in the direction reverse to that as identified by an arrow mark scribed with real lines. Once the sprocket 63 has been rotated in such a direction as described above, the one-way clutch 61 is kept in the freely rotatable state and therefore rotational power of the sprocket 63 is not transmitted to the joint member 59. Accordingly, in this case, rotational power outputted from the stepping motor 69 is transmitted only to the ink ribbon feeding roll 45 and thereby only the ink ribbon feeding roll 45 is rotated. At this moment the ink ribbon take-up roll 46 is caused to rotate as a follower roll by way of the ink ribbon 44. It should be also noted that since the ink ribbon take-up roll is affected by frictional force which is caused by the frictional plate 59b of the joint member 59 via the reel 55, the ink ribbon 44 is properly stretched.

The ink ribbon cassette 47 including the ink ribbon feeding roll 45, the ink ribbon take-up roll 46 and the ink ribbon, in the above-described manner, is fitted to the apparatus such that the ink ribbon is extended through the space as defined between the thermal head 25 and the platen roller 26 while coming in contact with the guide bars 41, 42 and 43.

Further, a roll of recording paper 80 is held on the recording paper holder 21 and its leading end 80a is drawn to the position located between the thermal head 25 and the platen roller 26 via the recording paper guide plate 22, the transportation roller 23, the automatic cutter 24 and the guide bar 42. The leading end 80a is drawn further until it reaches the position located behind the group of micro heating resistors on the thermal head 25.

When the cover frame 10b is opened away from the casing frame 10a by turning movement in the facsimile apparatus as constructed in the above-described manner, the transportation roller 23, the platen roller 26, the automatic cutter 24, the driving roller 27i a constituting the transportation rollers 27, the transportation roller 28 and the guide plates 30, 31a and 31b are displaced upwardly while following the turning movement of the cover frame 10b. At the same time the recording paper guide plate 22 is turned in the clockwise direction as seen in the drawing. As a result, the recording paper holder 21 and the fitting area for the ink ribbon cassette 47 are exposed to the outside. Now, an ink ribbon cassette 47 and a recording paper roll 80 are ready to be fitted to the casing frame 10a. When the cover frame 10b is closed, the platen roller 26, the automatic cutter 24, the driving roller 27a constituting the transportation rollers 27, the transportation roller 28 and the guide plates 30, 31a and 31b are restored to their original position and at the same time the recording paper guide plate 22 resumes its original state.

Next, a description is given of how the recording paper and the ink ribbon are transported and recording is effected.

Facsimile signals received via channel or cable are subjected to electrical processing such as modulating, coding, amplifying or the like so that they are converted into image signals. The converted image signals are then transitted to the thermal head 25 whereby the layer of solid ink 44 on the ink ribbon 44 is molten in conformance with the recorded pattern. Thus, recording is achieved by transferring molten ink onto the recording paper 80a under the influence of pressure provided by the platen roller 26. Incidentally, recording is carried out for each of the scanned lines and on completion of recording along one scanned line both the recording paper 80a and the ink ribbon 44 are transported further by a distance corresponding to one pitch of the scanned lines by means of the platen roller 26 and the transportation roller 23 both of which are driven by the common stepping motor 33, while they are superimposed one above another. Recording is repeated for all scanned lines while the recording paper 80a and the ink ribbon 44 are transported stepwise in the closely superimposed state. When they reach the guide bar 43, the direction of movement of the ink ribbon 44 is changed downwardly so that it is parted away from the recording paper 80a but the latter is caused to move further in the same direction due to its rigidity. Thereafter, the recording paper 80a thus separated from the ink ribbon 44 is transported further along the guide plates 31a and 31b while the driving roller 27a constituting the transportation rollers 27 adapted to rotate in synchronization with the platen roller 26 as well as the transportation roller 28 are rotated in cooperation with the pinch roller 27b and the leaf spring 29.

On completion of recording of a single page corresponding to the size of an original of which image signals have been transmitted to the facsimile signal receiving apparatus, the electromagnetic actuator 37 serving as means for releasing the thermal head 25 from the pressure contacted state is actuated and thereby the thermal head 25 is parted away from the platen roller 26 by its turning movement. Thus, both the recording paper 80a and the ink ribbon 44 are released from the pressed state and the stepping motor 33, adapted to rotate both the platen roller 26 and the transportation roller 23, is then caused to rotate in the reverse direction so as to move back the recording paper 80a on which recording has been effected. When the tail end of a single page of the recording paper 80a reaches the position where the stationary blade 24a comes in cutting contact with the movable blade 24b in the automatic cutter 24, that is, the position where cutting is achieved for the recording paper 80a, the stepping motor 33 is stopped immediately and the movable blade 24b of the automatic cutter 24 is actuated to cut the recording paper 80a to a predetermined length which is substantially the same as to the length of an original. Immediately after completion of the cutting operation the stepping motor 33 for rotating each of the platen roller 26, the transportation roller 23 and the transportation rollers 27 and 28 is rotated in the forward direction at a high speed whereby the recording paper 80a is transported further again.

On the other hand, on completion of recording of a single page of an original, a rotational power source, for instance, stepping motor 69 for the ink ribbon 44, stops its rotation and thereby transportation of the ink ribbon 44 is stopped. Then, the thermal head 25 is caused to move away from the platen roller 26 and thereafter the recording paper 80a is transported backwardly so that cutting is achieved at the tail end of a single page. After completion of the cutting operation, the recording paper 80a is transported forwardly again to the position where the leading end of the unused recording paper is located behind the group of heating resistors on the thermal head 25 by a predetermined distance, for instance, 3 mm, and the stepping motor 33 adapted to rotate both the platen roller 26 and the transportation roller 23 is then caused to stop its rotation so that means 37 for releasing the thermal head from the pressure contacted state is restored to the original position where the recording paper 80a and the ink ribbon 44 are clamped between the thermal head 25 and the platen roller 26 in the pressed state. Now, the apparatus is ready to start another recording operation.

The sheet of recording paper cut to a predetermined size is transported further by rotating the driving rollers 27a and the transportation roller 28 in cooperation with the pinch roller 27b and the leaf spring 29 until it is discharged from the apparatus and stored in the recording paper storage tray 12.

In the above-described embodiment of the invention arrangement is made such that the thermal head 25 and the platen roller 26 are parted away from one another by displacing the thermal head 25 away from the platen roller 26. However, the present invention should not be limited only to this. Alternatively, the thermal head 25 and the platen roller 26 may be parted away from one another by displacing the platen roller 26.

Figure 5:
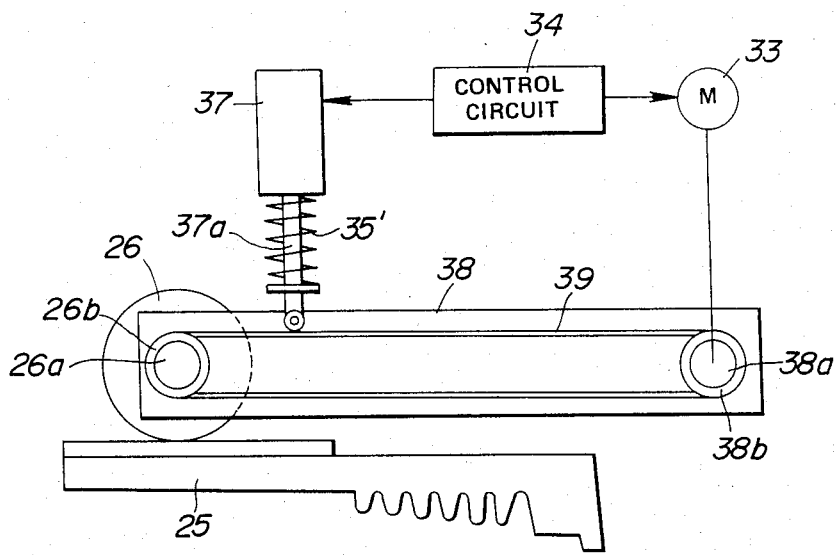
FIG. 5 is a schematic front view of pressure contact releasing means in the facsimile signal receiving apparatus in accordance with a modified embodiment of the invention for parting the platen roller away from the thermal head which is held immovably, shown in an enlarged scale.

FIG. 5 schematically illustrates a mechanism for displacing the platen roller 26 by way of an example. In the illustrated embodiment the shaft 26a of the platen roller 26 is rotatably supported on an arm 38 which in turn is supported pivotably about a shaft 38a on the cover frame 10b. Rotational power outputted from the stepping motor 33 is transmitted to the shaft 38a with the aid of power transmission means which is not shown in the drawing. The shaft 38a has a gear 38b fixedly secured to its one end, whereas the shaft 26a of the platen roller 26 has a gear 26b fixedly secured to its one end. A timing belt 39 is endlessly extended around both the gears 26b and 38b. Further, an electromagnetic actuator 37 is disposed at a predetermined position between the free end of the arm 38 and the cover frame 10b and a coil spring 35' is mounted on the plunger 27a of the electromagnetic actuator 37.

Thus, the arm 38 is normally biased toward the thermal head 25 by turning movement about the shaft 28 in the counterclockwise direction under the effect of the resilient force of the coil spring 35' whereby the platen roller 26 is brought in pressure contact with the thermal head 25. When the solenoid 37 is excited by means of the control circuit 34, the arm 38 is caused to turn in the clockwise direction so that the platen roller 26 is parted away from the thermal head 25. It should be noted that the stepping motor 33 is actuated under control of the control circuit 34 so as to rotate the shaft 38a via power transmission mechanism which is not shown in the drawing and thereby the platen roller 26 is rotated by means of the stepping motor 33 via the gear 38b, the timing belt 39, the gear 26b and the shaft 26a.

In the foregoing embodiment the automatic cutter is disposed in the area located on the right side relative to the platen roller 26 as seen in FIG. 1. However, the present invention should not be limited only to this. Alternatively, the automatic cutter 24 may be disposed in the area located between the platen roller 26 and the transportation rollers 27. In this case the apparatus is operated such that on completion of recording of the received signals the thermal head is parted away from the platen roller 26, the recording paper 80a is transported further, the recorded part of recording paper 80a is cut off and finally the thus cut recorded part is transported further to be discharged from the apparatus and to be stored on the recording paper storage tray 12. On the other hand, an unused part of recording paper 80a is transported backwardly to the position where its leading end is located away from the group of heating resistors on the thermal head 25 by a predetermined distance, for instance, 3 mm as measured therefrom. At this moment the recording paper 80a is held immovably and both the thermal head 25 and the platen roller 26 come in contact with one another with the recording paper 80a held therebetween. Now, the apparatus is ready to start the next recording operation. Obviously, the ink ribbon 44 stops its movement immediately after completion of recording operation in the same manner as in the foregoing case.

It should be course be understood that the present invention has been described above with respect to the embodiment where it is applied to a facsimile signal receiving apparatus but it should not be limited only to this, for example, it may be applied also to a printer.

What is claimed is:

1. A thermal transfer recording method for use in a thermal transfer recording apparatus having a thermal head, a roll of recording paper of ordinary paper material, a roll of an ink ribbon, cutting means for cutting of a part of said roll of recording paper, a platen roller, and pressure releasing means for releasing said thermal head and said platen roller from the pressure contacted state, said method comprising the steps of:

unwinding said roll of recording paper and said ink ribbon to bring them into pressure contact with said thermal head while superposing them one over the other;

selectively transferring ink from said ribbon onto said recording paper by means of said thermal head;

separating said recording paper away from said ink ribbon by said pressure releasing means;

transporting said recording paper until the last ink transferred part of said recording paper reaches said cutting means while holding said ink ribbon in a stationary position;

cutting said recording paper by said cutting means so that the ink transferred part of said recording paper is cut off; and transporting said recording paper until the leading end thereof is located in the proximity of said thermal head.

2. A thermal transfer recording apparatus comprising:

a frame means including a casing frame portion having an upper part with an opening, and a cover frame portion mounted to open and close the opening of said casing frame portion;

a recording paper holder rotatably mounted in said casing frame portion for holding a roll of recording paper of an ordinary paper material wound about a core;

ink ribbon holding means mounted in said casing frame portion and positioned to provide an ink ribbon in superimposed relation to recording paper unwound from said recording roll, said means including an ink ribbon feeding roll about which the ink ribbon is wound and an ink ribbon take-up roll;

a thermal head pivotably supported in said casing frame portion for transferring a layer of ink in molten semi-fused state from said ink ribbon onto a portion of recording paper unwound from the recording paper roll;

a platen roll mounted in said cover frame portion and positioned to come in contact with the recording paper, with the ink ribbon being in superimposed state with said recording paper;

spring means normally biasing said thermal head toward said platen roller;

pressure contact releasing means for releasing said thermal head from said normally biased platen roller position upon completion of a recording operation; and cutter means mounted in said cover frame portion for cutting off the recorded part of said recording paper upon completion of a recording operation.

3. The thermal transfer recording apparatus as defined in claim 2, wherein said cover frame portion is turnably supported in said casing frame portion by means of a shaft.

4. The thermal transfer recording apparatus as defined in claim 2, wherein a guide bar is provided in said cover frame portion such that the ink ribbon extended around said ink ribbon feeding roll and said ink ribbon taking-up roll comes in pressure contact with said guide bar when the opening of said casing frame portion is fully closed with said cover frame.

5. A thermal transfer recording apparatus comprising:

a frame means including a casing frame portion having an upper part with an opening, and a cover frame portion mounted to open and close the opening of said casing frame portion;

a recording paper holder rotatably mounted in said casing frame portion for holding a roll of recording paper of an ordinary paper material wound about a core;

ink ribbon holding means mounted in said casing frame portion and positioned to provide an ink ribbon in superimposed relation to recording paper unwound from said recording paper roll, said means including an ink ribbon feeding roll about which the ink ribbon is wound and an ink ribbon take-up roll;

a thermal head mounted in said casing frame portion for transferring a layer of ink in molten semi-fused state from said ink ribbon onto a portion of recording paper unwound from the recording paper roll;

a platen roller pivotably supported in said cover frame portion and positioned to come in contact with the recording paper, with the ink ribbon being superimposed on said recording paper;

spring means manually biasing said platen roller toward said thermal head;

pressure contact releasing means for releasing said platen roller from said normally biased thermal head position upon completion of a recording operation; and cutter means mounted in said cover frame portion for cutting off the recorded part of said recording paper upon completion of a recording operation.

6. The thermal transfer recording apparatus as defined in claim 5 wherein said cover frame portion is turnably supported in said casing frame portion by means of a shaft.

7. The thermal transfer recoding apparatus as defined in claim 5 wherein a guide bar is provided in said cover frame portion such that the ink ribbon extended around said ink ribbon feeding roll and said ink ribbon taking-up roll comes in pressure contact with said guide bar when the opening of said casing frame portion is fully closed with said cover frame portion.

8. The thermal transfer recording apparatus as defined in claim 2 wherein said pressure contact releasing means comprises an electromagnetic actuator.

9. The thermal transfer recording apparatus as defined in claim 5 wherein said pressure contact releasing means comprises an electromagnetic actuator.

10. The thermal transfer recording apparatus as defined in claim 2, wherein:

said casing frame portion includes first and second frame members, said frame members being positioned to oppose one another;

said ink ribbon holding means includes first, second, third and fourth shafts, said first and third shafts being supported by said first frame member and said second and fourth shafts being supported by said second frame member;

said ink ribbon holding means further includes first, second, third and fourth reels, said first reel being rotatably mounted on said first shaft, said second reel being rotatably mounted on said second shaft, said third reel being rotatably mounted on said third shaft, and said fourth reel rotatably mounted on said fourth shaft;

said ink ribbon feeding roll being rotatably supported between said first and second reels;

said ink ribbon take-up roll being rotatably supported between said third and fourth reels; and said ink ribbon holding means further includes first, second, third and fourth spring means;

said first and third spring means being disposed on said first and third shafts, respectively, and positioned between said first frame member and said first and third reels, respectively, to apply force to said first and third reels;

said second and fourth spring means being disposed on said second and fourth shafts, respectively, and positioned between said second frame member and said second and fourth reels, respectively, to apply force to said second and fourth reels;

said first and second reels thereby forcibly holding said ink ribbon feeding roll; and said third and fourth reels thereby forcibly holding said ink ribbon take-up roll.

11. The thermal transfer recording apparatus as defined in claim 10, further comprising:

first and second sprockets, said first sprocket being associated with said first reel and said second sprocket being associated with said third reel so as to translate rotation of said first and second sprockets to rotation of said first and third reels, respectively;

driving means including a third sprocket for driving said first and second sprockets; and chain means for connecting said first, second and third sprockets so as to translate rotation of said third sprocket to said first and second sprockets.

12. The thermal transfer recording apparatus as defined in claim 11, further comprising:

first and second joint members rotatably mounted on said first and third shafts, respectively, said first and third joint members being positioned to come into frictional contact with said first and third reels, respectively;

first one-way clutch interposed between said first joint member and said first sprocket, said first one-way clutch loading the rotation of said first sprocket in a first direction; and second one-way clutch interposed between said second joint member and said second sprocket, said second one-way clutch loading the rotation of said second sprocket in a second direction.

13. The thermal transfer recording apparatus as defined in claim 2, further comprising:

first guide bar arranged in said casing frame portion positioned between said recording paper holder and said platen roller to urge the unwound recording paper and the ink ribbon in superposition one above the other; and second guide bar arranged in said casing frame portion positioned on the opposite side of said platen roller from said first guide bar to permit the recording paper to separate from the ink ribbon.

14. The thermal transfer recording apparatus as defined in claim 5, wherein:

said casing frame portion includes first and second frame members, said frame members being positioned to oppose one another;

said ink ribbon holding means includes first, second, third and fourth shafts, said first and third shafts being supported by said first frame member and said second and fourth shatfs being supported by said second frame member;

said ink ribbon holding means further includes first, second, third and fourth reels, said first reel being rotatably mounted on said first shaft, said second reel being rotatably mounted on said second shaft said third reel being rotatably mounted on said third shaft, and said fourth reel rotatably mounted on said fourth shaft;

said ink ribbon feeding roll being rotatably supported between said first and second reels;

said ink ribbon take-up roll being rotatably supported between said third and fourth reels; and said ink ribbon holding means further includes first, second, third and fourth spring means;

said first and third spring means being disposed on said first and third shafts, respectively, and positioned between said first frame member and said first and third reels, respectively, to apply force to said first and third reels;

said second and fourth spring means being disposed on said second and fourth shafts, respectively, and positioned between said second frame member and said second and fourth reels, respectively, to apply force to said second and fourth reels;

said first and second reels thereby forcibly holding said ink ribbon feeding roll; and said third and fourth reels thereby forcibly holding said ink ribbon take-up roll.

15. The thermal transfer recording apparatus as defined in claim 14, further comprising:

first and second sprockets, said first sprocket being associated with said first reel and said second sprocket being associated with said third reel so as to translate rotation of said first and second sprockets to rotation of said first and third reels, respectively;

driving means including a third sprocket for driving said first and second sprockets; and chain means for connecting said first, second and third sprockets so as to translate rotations of said third sprocket to said first and second sprockets.

16. The thermal transfer recording apparatus as defined in claim 15, further comprising:

first and second joint members rotatably mounted on said first and third shafts, repectively, said first and third joint members being positioned to come into frictional contact with first and third reels, respectively;

first one-way clutch interposed between said first joint member and said first sprocket, said first one-way clutch loading the rotation of said first sprocket in a first direction; and second one-way clutch interposed between said second joint member and said second sprocket, said second one-way clutch loading the rotation of said second sprocket in a second direction.

17. The thermal transfer recording apparatus as defined in claim 5, further comprising:

first guide bar arranged in said casing frame portion positioned between said recording paper holder and said platen roller to urge the recording paper and the ink ribbon in superposition one above the other; and second guide bar arranged in said casing frame portion positioned on the opposite side of said platen roller from said first guide bar to permit the recording paper to separate from the ink ribbon.

* * * * *